United States Patent
Kasdorf

(10) Patent No.: US 7,045,928 B2
(45) Date of Patent: May 16, 2006

(54) POT OR CUP-SHAPED CARRIER

(75) Inventor: Wolfgang Kasdorf, Aarbergen (DE)

(73) Assignee: K-Tec Kunststoffverarbeitung GmbH, Schmitten (DE)

( * ) Notice: Subject to any disclaimer, the term of this patent is extended or adjusted under 35 U.S.C. 154(b) by 0 days.

(21) Appl. No.: 10/937,887

(22) Filed: Sep. 10, 2004

(65) Prior Publication Data
US 2005/0134139 A1    Jun. 23, 2005

(30) Foreign Application Priority Data
Sep. 11, 2003  (DE) ................ 103 42 222

(51) Int. Cl.
*H02K 13/00* (2006.01)
*H02K 15/14* (2006.01)

(52) U.S. Cl. .............. 310/239; 310/247; 310/242

(58) Field of Classification Search ........ 310/239, 310/242, 246, 238, 240, 241, 245, 247
See application file for complete search history.

(56) References Cited

U.S. PATENT DOCUMENTS

| | | | | |
|---|---|---|---|---|
| 4,774,754 A | * | 10/1988 | Stewart, Sr. | ........ 29/596 |
| 5,440,186 A | * | 8/1995 | Forsell et al. | ........ 310/239 |
| 5,495,134 A | * | 2/1996 | Rosenblum | ........ 310/239 |
| 6,528,922 B1 | | 3/2003 | Lee | |

FOREIGN PATENT DOCUMENTS

| | | |
|---|---|---|
| DE | 8803944 | 9/1988 |
| DE | 3731409 | 4/1989 |
| DE | 10063405 | 6/2002 |
| DE | 19705833 | 3/2006 |

* cited by examiner

*Primary Examiner*—Karl Tamai
*Assistant Examiner*—Leda Pham
(74) *Attorney, Agent, or Firm*—Dennison, Schultz, Dougherty & MacDonald

(57) ABSTRACT

The invention concerns a pot or cup-shaped carrier (10) for carbon brushes (12), especially intended for servomotors, comprising an inner wall, such as a bottom wall, originating from the carrier perimeter wall, and interspersed by the commutator or by a shaft originating therefrom, wherein each carbon brush is acted upon via a plate spring (14) in the direction of a commutator that is interspersed by the carrier. In order that the plate spring, which is required to act upon the carbon brushes, can be held back in a defined manner during assembly, while at the same time allowing facilitation of an easy release, without the need for removed elements, it is suggested that the inner wall have partially cut-free spring-loaded first sections, from each of which a holding section originates, which extends along the longitudinal axis of the carrier (10), wherein each holding section has a carbon brush (12) assigned to it in such a way that the carbon brush is freely displaceable in the direction of the commutator, or is held in a pulled-back position, a certain distance from the commutator.

14 Claims, 6 Drawing Sheets

POT OR CUP-SHAPED CARRIER

Figure 1:
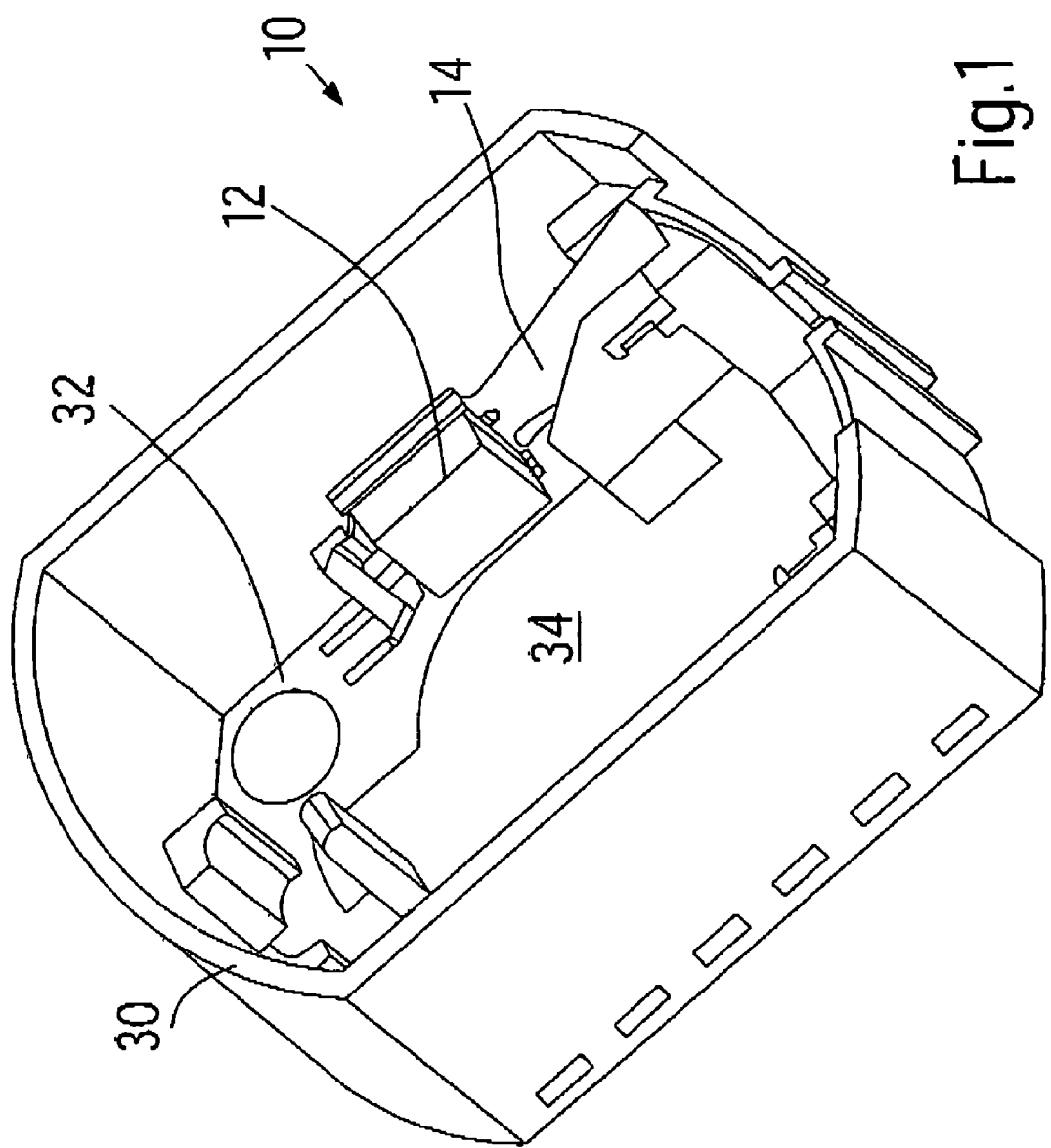

The invention concerns a pot or cup-shaped carrier for carbon brushes, especially intended for servomotors, with an inner wall such as a bottom wall that extends from an all-around carrier wall and is interspersed with a commutator and/or a shaft that extends from said commutator, wherein a plate spring acts on each carbon brush in the direction of the commutator, which is surrounded by the carrier, and wherein spring-loaded first sections with a holding section each start at the inner wall, to each of which a carbon brush is assigned in such a way that the carbon brush is freely displaceable in the direction of the commutator, or is held in a pulled-back position to keep a distance to the commutator.

A corresponding carrier is known from EP 0 823 768 B1. Herein, the bottom wall extends in the area of the intersection between a motor housing and a transmission housing, which houses a transmission actuable by the motor. In the area of the bottom wall a frame or a flange may protrude to the outside from the carrier, which frame or flange runs between the motor housing and the transmission housing, and is braced between these. If necessary, the frame and/or the flange may have a gasket, or may be designed as such. In the assembly of the carrier, precautions must be taken to ensure that the commutator will not damage the carbon brushes. Therefore, they must be moved outside of the sliding path of the commutator. When plate springs are utilized to act upon the carbon brushes in the direction of the commutator, an excessive backward bending may lead to damage, so that the operation of the plate spring will not produce the required spring force.

The process of holding back carbon brushes during assembly by means of some auxiliary means is known. The related suggestions, however, concern only carbon brushes, which are acted upon via helical or spiral springs. Thus, U.S. Pat. No. 3,968,321 accordingly provides for a spring-driven lever to act upon a carbon brush.

U.S. Pat. No. 4,658,328 also provides for a pivotable lever, which engages into indentations worked into the carbon brush, in the case of a helical spring acting upon a carbon brush.

In U.S. Pat. No. 5,495,134 a carbon brush holder is described, in which a carbon brush is fixable by means of a pivotable lever that juts out from the carrier plate, which lever pivots when it is installed into a motor, and disengages from the carbon brush.

In order to avoid the disadvantages of these types of levers, EP 0 236 254 B1 suggests that the carbon brushes be placed at a distance from one another by means of a removable assembly ring, which is pushed out when the commutator is engaged.

From DE-A-37 31 499 an electric motor is known, in which carbon brushes are held back during assembly by means of holding sections. The holding sections are formed by holding latches that are formed on a cover, which are shaped in such a way that a capacitor is fixed at the protruding arm when the holding latch is pivoted.

An electric motor for toys is known from U.S. Pat. No. 6,528,922. The carbon brushes that rest on a commutator originate at L-shaped plate springs.

In a holder for carbon brushes according to DE-C-100 63 405 the carbon brushes rest with their backsides flat against a section of a plate spring that has a U-shaped section.

According to DE-U-88 03 944 carbon brushes are fixed in sections of a plate spring, which in turn are formed in U-shape section by section.

According to DE-A 197 05 833 carbon brushes are connected conductively with circuit boards, without the need for special contact elements.

The present invention is based on the problem of further developing a carrier of the type stated at the beginning, such that the plate spring that is required to apply force to the carbon brushes can be held back during assembly in a controlled manner above the holding section, while at the same time an easy release is facilitated. In this, the holding section must be constructively simple in design, and a problem-free pivoting for the release of the carbon brushes must be guaranteed.

According to the invention, the problem is solved in that the first section of the inner wall is partially cut free, and is rod-shaped, and in that the holding section extends at a 90-degree angle, or nearly a 90-degree angle starting from the first section to the inside of the carrier.

According to the invention, the plate spring that acts on the carbon brush to the desired degree can be retained or released above or at about the pivotable holding section starting at the first section running along the level braced inner wall, hereinafter designated the bottom wall, without the need to support the carbon brushes against one another via holding rings, and without the need for the carbon brushes to have a special structure, in order to enable a combined effect with a holding element. In this, the first section extends along [an] inner surface of the carrier, to which the carbon brush can be moved. Thus, a space-saving arrangement is made possible.

In addition, the holding section may be equipped with a second section that protrudes at its free end in the direction of the carbon brush, which interacts with a third section that originates at the plate spring and/or with the carbon brush.

Hereby, the first section together with the holding section protruding from it form an L-shape, wherein pivoting around an axis is possible, which extends in the area in which the first section is connected to the bottom wall of the carrier.

The section that originates at the plate spring and interacts with the holding section, or the third section, may also be L-shaped.

To pivot the holding section, only an amount of force applied to the porter that originates at the rod-shaped first section, which can also be designated as a dome, is needed to pivot the holding section to such a degree that the carbon brush is released. In this, the holding section extends relative to the carbon brush such that when the carbon brush is released, the holding section extends along the side of the carbon brush or the plate spring that faces away from the commutator.

A further development of the invention provides for the plate spring to be U-shaped with legs of unequal length, as well as a transverse leg. In this, the longer leg acts upon the carbon brush, whereas the shorter leg is connected to a power source. For this purpose, the shorter leg may have a protruding section that extends in the plane that is spanned by the short leg, wherein said section is connected, e.g. soldered, to a partially extrusion-coated strip conductor such as a pressed screen, or board.

The plate spring, in particular, is implemented in a single piece. The plate spring may be a bent or folded stamped component, and preferably consists of stainless steel or a tin material for springs.

Furthermore, for the purpose of fastening the plate spring it is provided that preferably rod-shaped sections protrude from the perimeter wall into the inside of the carrier, which spaced slightly from one another, with said spacing being equal or approximately equal to the distance of the legs of the plate spring.

The wall sections thus delimit a U-shaped seat for the transverse-legged area of the plate spring, which is fastened in such a way that its edge that extends between the longer leg and the transverse leg rests against a corner of the U-shaped seat. This guarantees that the free bending length of the longer leg, which holds the carbon brush, is defined and unchanged. At the same time, these measures guarantee that only radial and no axial movement relative to the commutator is performed.

Furthermore, the carbon brush can be connected flat, especially by means of soldering or welding, to the longer leg, wherein the carbon brush sits planar on its backside that faces away from the commutator on the longer leg.

In the following, the invention is explained in more detail by way of a preferred exemplary embodiment that is contained in the drawing.

Figure 2:
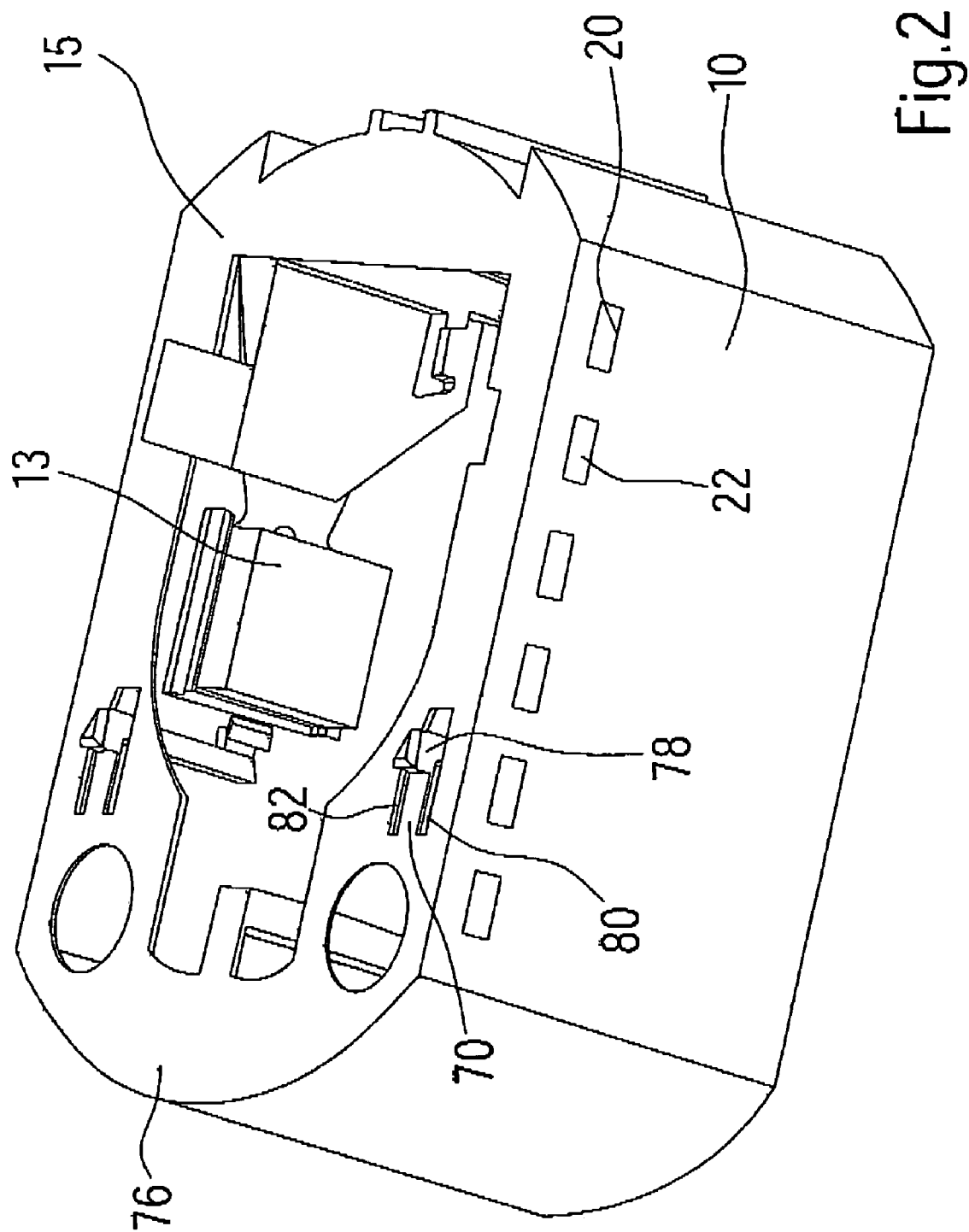
Figure 3:
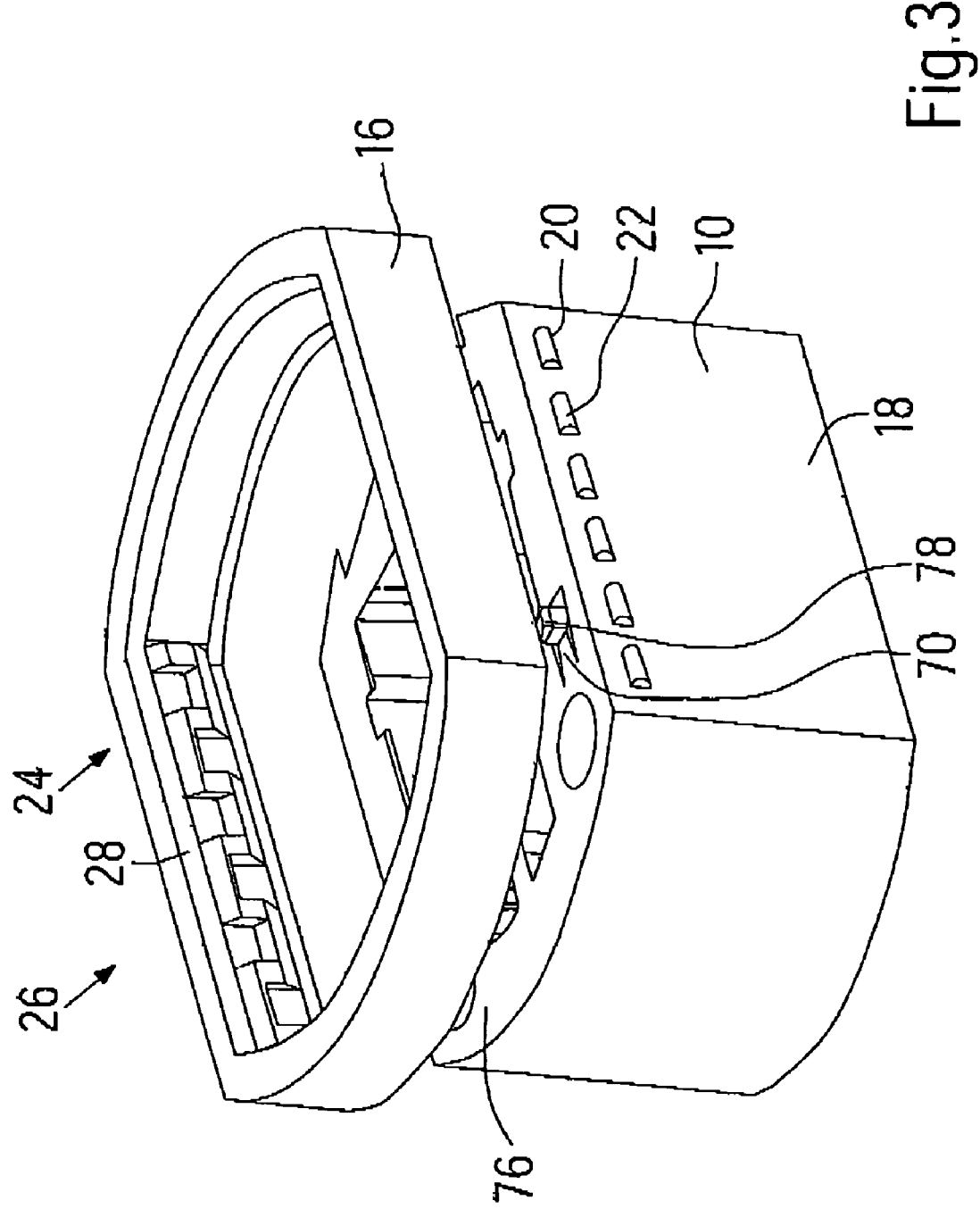
Figure 4:
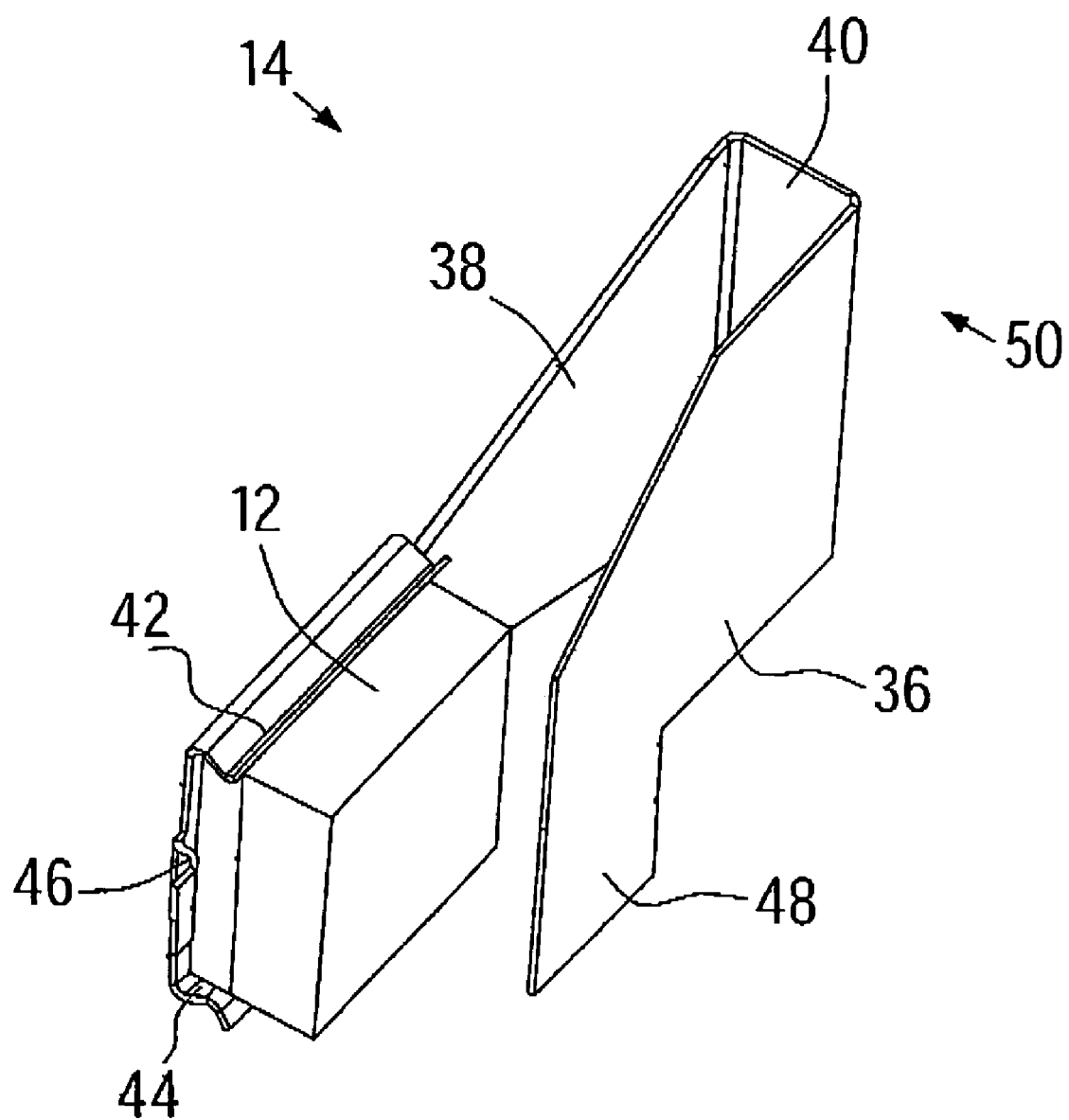
Figure 5:
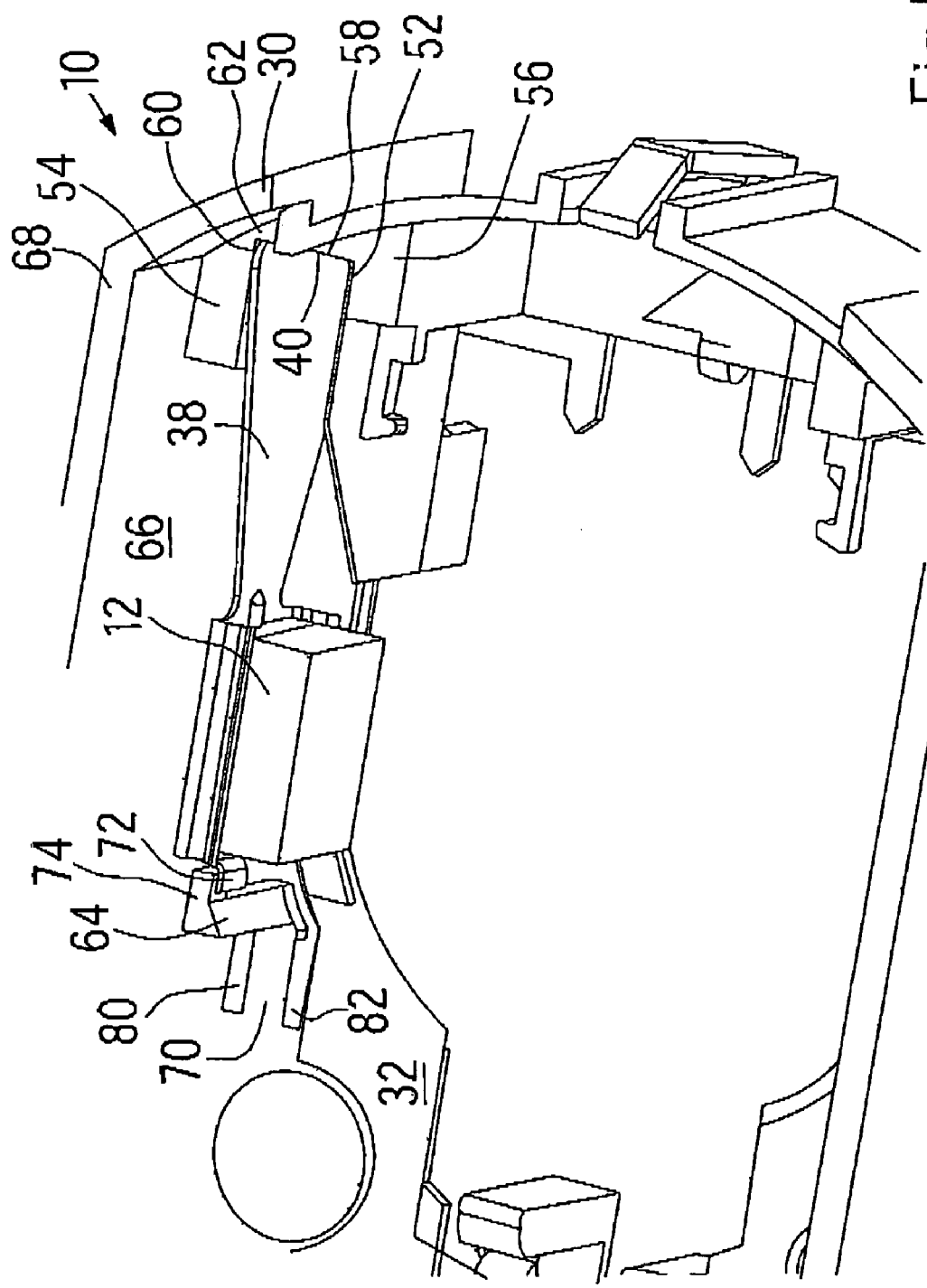
Figure 6:
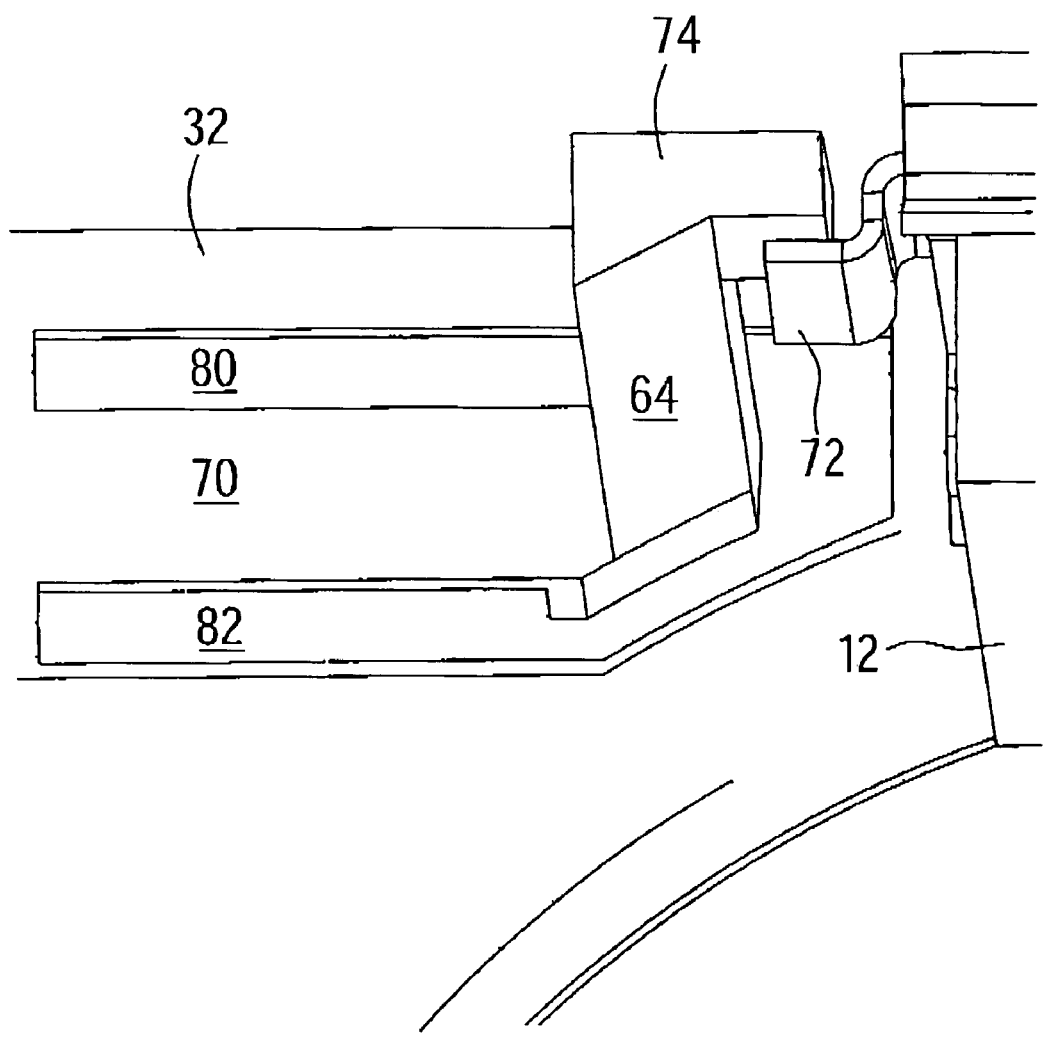

Shown are:

FIG. 1 a perspective view of a carrier with a carbon brush held by it;

FIG. 2 the carrier according to FIG. 1 seen from the outside;

FIG. 3 the carrier according to FIGS. 1 and 2 with a frame assigned to it;

FIG. 4 a perspective view of a plate spring with carbon brush;

FIG. 5 an enlarged view of a section of the carrier according to FIGS. 1 and 2; and FIG. 6 an enlarged view of another section of the carrier according to FIGS. 1 and 2.

The figures show various views and/or sections of a carrier 10 for holding carbon brushes 12, 13, each of which is acted upon via a plate spring 14, 15 in the direction of a commutator, which is not shown here, and which extends inside the carrier 10. The commutator forms part of a motor-transmission-unit, such as is used, for example, for electrical window openers, power seats, or sunroofs in motor vehicles.

The carrier 10 may be arranged inside a motor housing holding the motor, and may be fixed and braced between the motor housing and a housing that holds the transmission, preferably via a frame 16 that is cogged with the carrier.

To cog the frame 16 with the carrier 10, cog porters 20, 22 protrude from the carrier 10, i.e. its outside surface 18, and engage flush into the corresponding engaging seats 24, 26 in the inside 28 of the frame. Obviously it is also possible for the frame 16 to be formed as an integral part of the carrier 10.

As can be seen from the drawing views, the carrier 10, in an inner or intermediate wall, which extends transverse to its perimeter wall 30 and is preferably realized as a bottom wall 32, has a central breakthrough for the commutator, or a shaft that originates from said commutator.

With a mounted carrier 10, the bottom wall 32 extends in the area of the intersection between the motor housing and the transmission housing. Another arrangement is of course also possible.

The carbon brushes 12, 13 seated at the commutator, are acted upon via plate springs 14, 15, which are U-shaped. As FIG. 4 demonstrates, the plate spring 14, and thus also the plate spring 15, has two legs of unequal length 36, 38, as well as a transverse leg 40 connecting them. The carbon brush 12 extends from the longer leg 38, and may be fixed by means of angled edge sections 42, 44, 46 of the leg 38. In addition or especially as an alternative, the carbon brush 12 may be connected form-flush, such as welded or soldered, to the leg 38. For this purpose, the carbon brush 12 may have a metal coating on the leg.

For the supply of power, an angled section 48 of the shorter leg 36 can be used, which extends in the plane that is spanned by the leg 36, and which can be connected, especially by soldering, to a strip conductor that is extrusion-coated into the bottom wall 32, or to a board.

For the unequivocal fastening of the plate spring 14, its transverse-legged area 50 extends in a U-shaped recess 52, which is delimited by rod-shaped wall sections 54, 56 protruding from the perimeter wall 30 of the carrier 10 into the inside of the carrier. The sections 54, 56 are delimited by a wall 58 that extends transverse to them, so that the inner surfaces of the U-shaped recess 52 describe right angles to one another.

The edge 60 between the longitudinal leg 38 and the transverse leg 40 of the plate spring 14 is positioned in the recess 52 in such a way that the former is seated in the corner 62 that extends between the wall 58 and the rod-shaped section 54, or its inner surface. In this position, the fastening of the plate spring 14 is effected by the section 48, with the result that the plate spring 14, i.e. its longer leg 38 that holds the carbon brush 12, is adjustable relative to the commutator only radially and not axially. This is of great advantage when shifting the motor. Furthermore, the effective length of the longer leg 38 is defined, thus defined forces in turn act upon the carbon brush 12, when it is seated at the commutator.

To bring the carbon brushes 12, 13 outside of the sliding path of the commutator during assembly of the carrier 10 and the motor, to prevent any damage, the invention provides for each of the carbon brushes 12, 13 to be fixable in a retained position by means of a thereto assigned holding section 64. The holding section 64, which extends parallel or approximately parallel to the inner surface 66 of the wall 68 that extends along the longer leg 38 of the plate spring 14, or parallel to the longitudinal axis of the carrier 10, starts from a rod-shaped or latch-shaped released section 70 of the bottom wall 32. A spring action results from this, which makes it possible, that by pivoting the holding section 64, the carbon brush 12 is released, provided it is held back by the holding section 64.

In order to hold back the carbon brushes 12, 13, an L-shaped section 72 of the leg 38 of the plate spring 34 that projects outward is provided, which interacts with a cuboid-shaped porter 74 that extends in the direction of the carbon brush 12, and protrudes from the holding section 64. For the carbon brush 12 to be released, it is only necessary for the section 74 to become disengaged from the section 72 that protrudes from the leg 38. To this end, in the embodiment, the section 70 is pivoted into the inside of the carrier 10. To facilitate the pivoting action, the section 70 has at its outside a porter 78, which can be described as dome-shaped and extends over the outer surface 76 of the bottom wall 32, wherein said porter must be pressed in the direction of the inside of the carrier 10, so that the holding section 64, or the porter 74 protruding therefrom, becomes disengaged from the carbon brush 12, or the leg 38 of the plate spring 14. The carbon brush 13 is fastened accordingly, as can be seen in principle from FIG. 2. The pivot axis of the holding section 64, and therefore of the section 70, extends in the area of the bottom wall 32, in which slots 80, 82 that delimit the section 70 and extend parallel to one another end.

The invention claimed is:

1. Pot or cup-shaped carrier (10) for carbon brushes (12, 13), especially intended for servomotors, with an inner wall (32), such as a bottom wall, that originates from the carrier perimeter wall and is interspersed by a commutator or by a shaft that originates therefrom, wherein each carbon brush is acted upon by a leaf spring (14, 15) in the direction of the commutator that is surrounded by the carrier; and from the inner wall spring-mounted first sections (70), each with a holding section (64), originate, to each of which a carbon brush is assigned such that the carbon brush is freely displaceable in the direction of the commutator, or is held in a pulled-back position to maintain a distance to the commutator, said first section (70) is partially cut out from the inner wall (32) and is web-shaped and the holding section (64) extends in a right angle, or almost in a right angle starting from the first section to the inside of the carrier, wherein said holding section (64) interacts with said leaf spring (14, 15).

2. Pot or cup-shaped carrier according to claim 1, characterized in that the holding section (64) has at its free end a second section (74) that protrudes downward in the direction of the carbon brush (12), which interacts with a third section that originates from the leaf spring.

3. Pot or cup-shaped carrier according to claim 2, characterized in that the third section (72) that originates from the leaf spring (14) has an L-shape with a free leg, said free leg is seated at the holding section (64), or at the second section (74) protruding therefrom, when the carbon brush (12) is in a pulled-back position.

4. Pot or cup-shaped carrier according to claim 1 characterized in that the first section (70) is delimited by slots (80, 82) that extend parallel to one another, and which themselves extend along the inner surface (66) of the carrier (10), along which the leaf spring (14) extends.

5. Pot or cup-shaped carrier according to claim 1, characterized in that the inner wall (32) is the bottom wall of the carrier (10).

6. Pot or cup-shaped carrier according to claim 1, characterized in that the leaf spring (14, 15) has a U-shape with legs of unequal length (36, 38), as well as a transverse leg (40).

7. Pot or cup-shaped carrier according to claim 6, characterized in that the carbon brush (12, 13) is connected to the longer leg (38) and the shorter leg (36) is connected to a power source.

8. Pot or cup-shaped carrier according to claim 6, characterized in that the shorter leg (36) has a protruding section (48) that extends in a plane that is spanned by said shorter leg, with said protruding section being connected, such as soldered, to an at least partially extrusion-coated strip conductor, or printed board.

9. Pot or cup-shaped carrier according to claim 6, characterized in that from the perimeter wall of the carrier (10) a pair of web-shaped wall sections (54, 56) project at a slight distance that is equal or approximately equal to the distance to the legs (36, 38) of the leaf spring (14,15).

10. Pot or cup-shaped carrier according to claim 9, characterized in that the web-shaped wall sections (54, 56) delimit a U-shaped recess (52) for the transverse-leg-side area (50) of the leaf spring (14, 15).

11. Pot or cup-shaped carrier according to claim 10, characterized in that the leaf spring (14, 15) that is fastened inside the carrier (10) is seated with its edge (60) that extends between the transverse leg (40) and the longer leg (38), in a corner (62) of the U-shaped recess (52).

12. Pot or cup-shaped carrier according to claim 6, characterized in that the longer leg (38) of the leaf spring (14, 15) is connected to the carbon brush (12, 13) especially by means of soldering or welding.

13. Pot or cup-shaped carrier according to claim 12, characterized in that the carbon brush (12, 13) is seated flat, on its backside that faces away from the commutator, on the longer leg (38).

14. Pot or cup-shaped carrier according to claim 6, characterized in that the leaf spring (14, 15) is implemented in a single piece.

\* \* \* \* \*